(12) United States Patent
Vidal et al.

(10) Patent No.: US 11,522,759 B2
(45) Date of Patent: Dec. 6, 2022

(54) METHOD AND DEVICE MANAGER FOR CONTROLLING PROGRAM COMPONENTS IN A NETWORK DEVICE

(71) Applicant: Telefonaktiebolaget LM Ericsson (publ), Stockholm (SE)

(72) Inventors: Allan Vidal, Indaiatuba (BR); Ahmad Rostami, Solna (SE); Mateus Santos, Sao Paulo (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/642,896

(22) PCT Filed: Sep. 15, 2017

(86) PCT No.: PCT/SE2017/050910
§ 371 (c)(1),
(2) Date: Feb. 27, 2020

(87) PCT Pub. No.: WO2019/054909
PCT Pub. Date: Mar. 21, 2019

(65) Prior Publication Data
US 2020/0351152 A1    Nov. 5, 2020

(51) Int. Cl.
*H04L 41/0893* (2022.01)
*H04L 41/082* (2022.01)

(52) U.S. Cl.
CPC ........ *H04L 41/082* (2013.01); *H04L 41/0893* (2013.01)

(58) Field of Classification Search
CPC ..... G06F 8/60; G06F 8/63; G06F 8/70; H04L 41/08; H04L 41/0806; H04L 41/0813; H04L 41/084; H04L 67/10; H04L 63/20
See application file for complete search history.

(56) References Cited

U.S. PATENT DOCUMENTS

| 7,711,775 | B2 | 5/2010 | Tavis et al. |
| 9,276,877 | B1 | 3/2016 | Chua et al. |

(Continued)

FOREIGN PATENT DOCUMENTS

WO    2018067889 A1    4/2018

OTHER PUBLICATIONS

International Search Report and Written Opinion for International Application No. PCT/SE2017/050910, dated Jul. 2, 2018, 12 pages.

(Continued)

*Primary Examiner* — Tom Y Chang
(74) *Attorney, Agent, or Firm* — Nicholson De Vos Webster & Elliott LLP

(57) ABSTRACT

A method and device manager for controlling program components in a network device, wherein the network device is used for handling data traffic in a communication network. First, the device manager identifies, out of a set of predefined policies, a policy comprising rules which determine how the network device should operate when handling data traffic. Then, program components required to fulfil the identified policy are identified and existing program components present in the network device are determined. The device manager further pushes any of the required program components being absent in said existing program components, to the network device. Thereby, any network device(s) can be configured and/or upgraded automatically according to appropriate predefined policies, requiring a minimum of manual work. The predefined policies can also easily be modified or extended to deploy new and/or upgraded functions.

14 Claims, 5 Drawing Sheets

(56) References Cited

U.S. PATENT DOCUMENTS

| | | | |
|---|---|---|---|
| 9,916,233 B1* | 3/2018 | Qureshi | G06F 8/70 |
| 2010/0257264 A1* | 10/2010 | Assadzadeh | H04L 29/06 |
| | | | 709/223 |
| 2014/0337497 A1* | 11/2014 | Wanser | H04L 41/0866 |
| | | | 709/223 |
| 2016/0094461 A1 | 3/2016 | Shetty et al. | |
| 2016/0149774 A1 | 5/2016 | Chastain | |
| 2017/0063608 A1 | 3/2017 | Wang et al. | |
| 2017/0093924 A1 | 3/2017 | Loo et al. | |
| 2017/0099182 A1 | 4/2017 | DeBolle et al. | |
| 2018/0046503 A1* | 2/2018 | Feng | G06F 9/5077 |
| 2019/0007303 A1* | 1/2019 | Wackerly | H04L 45/64 |
| 2019/0079788 A1* | 3/2019 | Ruty | G06F 9/5077 |
| 2020/0021519 A1* | 1/2020 | Schneider | H04L 45/38 |

OTHER PUBLICATIONS

International Preliminary Report on Patentability for International Application No. PCT/SE2017/050910, dated Mar. 26, 2020, 9 pages.
"The World's Fastest & Most Programmable Networks," 2016, 16 pages, Barefoot Networks, Inc.
"OF-PI: A Protocol Independent Layer," Sep. 5, 2014, 23 pages, Version 1.1, ONF TR-505, Open Networking Foundation.
Announcing the 3rd P4 Developer Day on May 16, 2017 and 4th P4 Workshop on May 17, 2017, 2 pages, P4 Language Consortium.
"P4 Experimental Support via BMv2," 2016, 9 pages.
Supplementary European Search Report and Search Opinion, EP App. No 17924890.1, dated Mar. 24, 2021, 8 pages.
Communication under Rule 71(3) EPC, EP App. No. 17924890.1, dated Feb. 15, 2022, 68 pages.
Decision to grant a European patent EP App. No. 17924890.1, dated Jun. 10, 2022, 2 pages.

* cited by examiner

METHOD AND DEVICE MANAGER FOR CONTROLLING PROGRAM COMPONENTS IN A NETWORK DEVICE

CROSS-REFERENCE TO RELATED APPLICATIONS

This application is a National stage of International Application No. PCT/SE2017/050910, filed Sep. 15, 2017, which is hereby incorporated by reference.

TECHNICAL FIELD

The present disclosure relates generally to a method and a device manager, for controlling program components in a network device used for handling data traffic in a communication network.

BACKGROUND

Recently, so-called Software Defined Networks, SDN, have been proposed to enable communication of data. An SDN contains various nodes for data transport, which nodes will be referred to as "network devices" in this description. The network devices in an SDN are thus used for handling data traffic, also referred to as data or traffic flows, in the network. The network devices described herein may include various switches, routers and firewalls which operate according to software or data programs installed therein. An SDN is schematically illustrated in FIG. 1 where switches, routers and firewalls are configured with software SW to control their operation. For example, a common open interface such as OpenFlow may be used by any vendors to configure operation of a network device. In reality, an SDN typically comprises several switches and routers which are interconnected to form a network topology, and it should be noted that FIG. 1 is schematic and much simplified.

In order to make the network devices to operate in a manner required, it should be possible to configure them with so-called "program components" which are basically pieces of software that can be executed on a processor to control operation of the network devices when handling data traffic. The network devices described herein may thus include various switches, routers and other traffic handling entities through which data flows pass when transported across the network. The program components are installed in the network devices for execution in a dataplane to perform different operations of handling data traffic which may be related to switching and forwarding as well as firewall operations and any other traffic-related operations that could be performed in the different network devices, depending on their functionalities.

Although the term "program component" is used consistently herein to represent any piece of software, other terms could be used instead, e.g. including "dataplane components", "software components", and so forth. Basically, a program or a program component can be pushed into a network device for execution in the device when handling data traffic. The program or program component comprises software code in a format that depends on the technology used, and some illustrative but non-limiting example formats include an executable binary, a compressed bundle of software artifacts, a script, and so forth. A commonly used technology that may enable program components is the P4 programming language.

It is often desirable or even necessary that the network devices in a communication network behave and operate in a certain consistent and coordinated manner, which is achieved by pushing the correct program components to the network devices to make sure they operate in the manner required. For example, one set of network devices may be required to operate in one manner while another set of network devices may be required to operate in another different manner.

However, one problem is that it is often difficult to find out which program components a particular network device needs to have installed to work properly, and considerable work and efforts must be spent to achieve the correct operation in a network with a great number of network devices of different kinds which need to have respective correct program components. For example, network administrators often need to manually handle conflicting behavior, differences in software versions, component upgrades, etc., directly in each network device. It can therefore be very time-consuming to introduce new services and functions in the network as it typically requires manual efforts for each individual device.

U.S. Pat. No. 7,711,775 B2 describes how a "system component manager" in a client may be used for finding component resources from a location specified by a Unified Resource Location, URL. The component resources are then downloaded by a download manager and installed by an install manager. The functionality for installing program components according to this document thus resides in the device itself.

SUMMARY

It is an object of embodiments described herein to address at least some of the problems and issues outlined above. It is possible to achieve this object and others by using a method and a device manager as defined in the attached independent claims.

According to one aspect, a method is performed by a device manager for controlling program components in a network device, wherein the network device is used for handling data traffic in a communication network. In this method, the device manager identifies a policy out of a set of predefined policies, the identified policy comprising rules which determine how the network device should operate in the communication network. This action does not exclude that more than one policy may be identified. The device manager further identifies program components required to fulfil the identified policy, and also determines existing program components present in the network device. The device manager then pushes to the network device one or more of the required program components absent in said existing program components in the network device. In some cases, all the required program components including the existing ones need to be pushed to the network device depending on the technology used.

According to another aspect, a device manager is arranged to control program components in a network device, wherein the network device can be used for handling data traffic in a communication network. The device manager is configured to identify a policy out of a set of predefined policies, the identified policy comprising rules which determine how the network device should operate in the communication network. The device manager is also configured to identify program components required to fulfil the identified policy, and to determine existing program components present in the network device. The device manager is further configured to push to the network device one or more of the required program components absent in said existing program components in the network device.

The above method and device manager may be configured and implemented according to different optional embodiments to accomplish further features and benefits, to be described below.

A computer program is also provided comprising instructions which, when executed on at least one processor in the device manager, cause the at least one processor to carry out the method described above. A carrier is also provided which contains the above computer program, wherein the carrier is one of an electronic signal, optical signal, radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
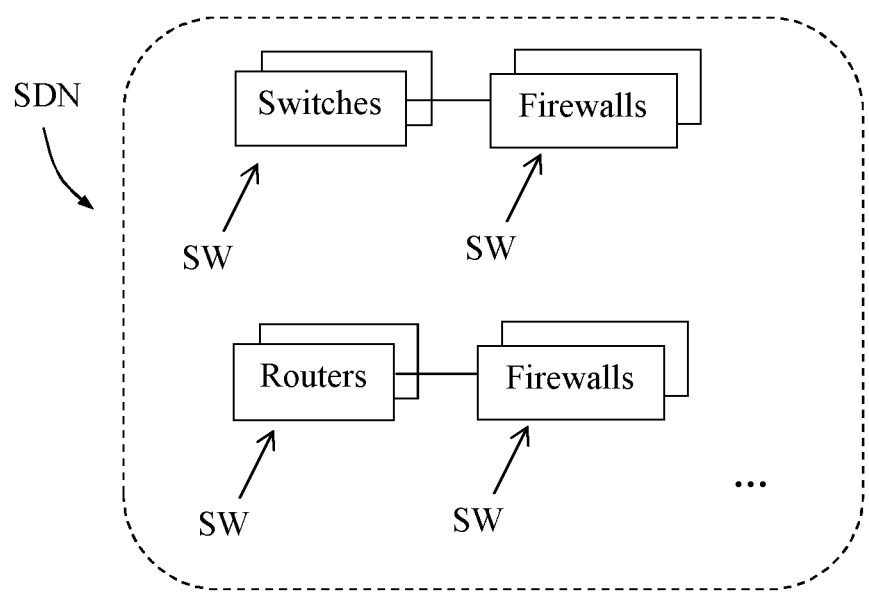
FIG. 1 is a schematic illustration of a Software Defined Network, SDN, according to the prior art.

Briefly described, a solution is provided to enable automatic and consistent deployment of program components in network devices of a communication network, such as an SDN. This can be achieved by means of predefined policies which determine what program components different network devices should have installed in order to operate and "behave" as required. In this solution, a network device is required to operate in accordance with one or more predefined policies which are valid for the network device, and such valid policies can be identified from a set of predefined policies, to be described in more detail below. Even though the solution will be described in terms of "a policy" for simplicity, it should be understood that more than one policy may be valid for a network device and that the following description can be applied for any number of policies that are valid for the network device herein.

The solution can be realized in a central entity which will be denoted "device manager" in the following description. However, other terms are also possible to use instead of device manager, such as "program controller", "device configuring unit/node" or "program component manager", to mention a few examples. The device manager is able to serve any number of network devices and may be implemented in a node belonging to the network or in a node outside the network but capable of communicating with the network devices as described herein.

The device manager is capable of identifying which policies are valid for any particular network device that needs to be configured with program components. This may be triggered e.g. when the network device has joined the network or when detecting that a policy that affects the network device has been added, removed or changed which requires updating of the existing program components in the network device when already present in the network. Hence, an added/removed/changed policy that affects the network device may require that relevant program components are to be upgraded or removed from the network device. A program update may thus be triggered when a new policy is introduced or when an existing policy has changed so that any network device that is required to operate according to that policy needs to be updated to conform with the new or changed policy.

It is also possible that more than one policy is valid for a network device or for a set of network devices. For example, there may be an explicit list of network devices or querying specifications which are interpreted by the device manager to decide which network devices need to be handled as described herein. Throughout this description, the term "a policy" should thus be understood as "at least one policy". It is assumed that the device manager has access to a set of predefined policies including information about which network device(s) should follow each respective policy. The predefined policies may also indicate which program components are needed to accomplish the required operations. It should be noted that any policies in the set of predefined policies may at any time be changed even on a dynamic basis, as discussed below, but they can nevertheless be considered "predefined" when the procedure herein is performed. Such policies may be predefined manually or by some network control application(s) or the like, which is somewhat outside the procedure described herein.

The identified policy has thus been predefined as valid for this particular network device and contains rules which determine how the network device should operate or "behave" in the network. The rules in a policy may indicate which program components are needed in the network device to accomplish this operation/behavior. For example, the policy may be valid for one specific network device or for a set of network devices of a particular type, model, manufacturer, etc., although the validity of the policy discussed herein is not limited to these examples. When the program components needed to fulfill the policy have been identified, any of those program components that are absent, i.e. missing, in the device's existing program components is/are pushed to the device for installation.

Thereby, the network device will have all program components necessary to fulfill the policy and can operate accordingly.

Depending on the implementation, the absent/missing program components may not be pushed by the device manager directly. They may first be marked for installation. These markings for installation/removal may then be sent to a so-called Dataplane Component Provider, to be described below with reference to FIG. 5, for making a decision on how to generate deployment artifacts corresponding to the program components to be pushed to the network device. For example, it may be required that also existing program components which are already installed in the network device are re-compiled or re-bundled when new program components are added.

When the above solution is used, it is an advantage that any number of network devices can be configured and/or upgraded automatically and consistently according to appropriate predefined policies, and the manual work required is reduced to a minimum. Further, the entire network or any parts thereof can be upgraded in a flexible manner, e.g. to introduce new or modified services, simply by defining rules in a corresponding policy e.g. for a selected set or group of network devices. The set of predefined policies may thus be maintained and updated in a simple and dynamic manner to achieve any desired operation of the network devices in the network.

Figure 2:
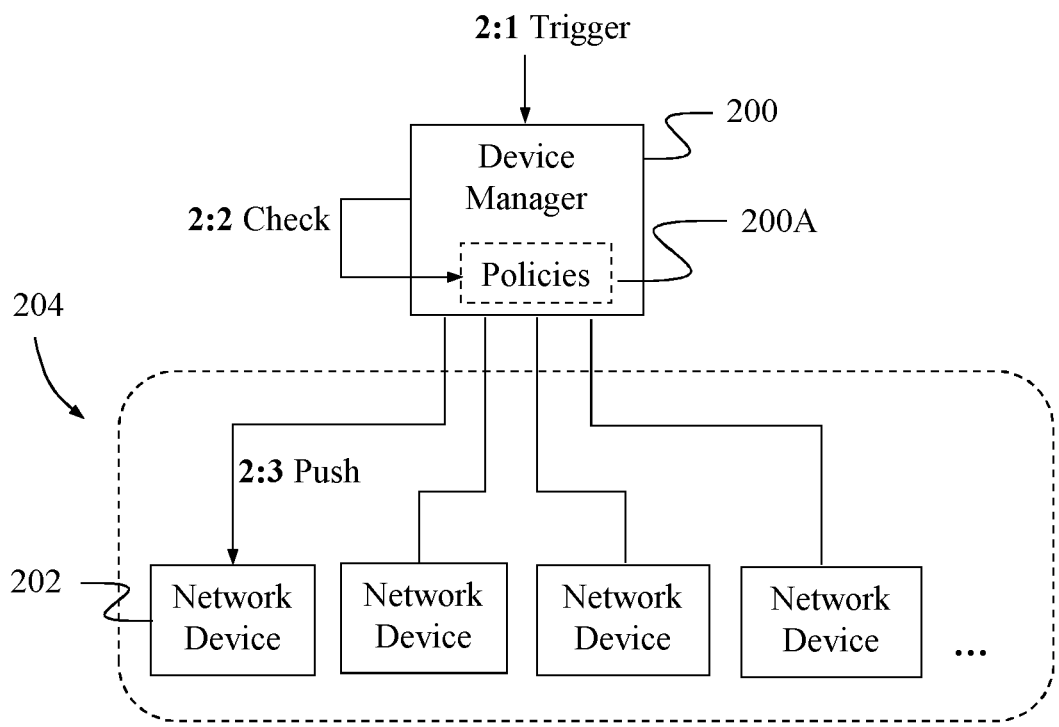
FIG. 2 is a communication scenario illustrating an example of how program components may be installed on a network device by means of a device manager, according to some example embodiments.

An example of how program components may be installed on a network device by means of a device manager, will now be described with reference to FIG. 2 which illustrates a communication network 204, such as an SDN, comprising various network devices which can be served by a device manager 200 for deploying new or upgraded software in terms of program components. As noted above, the solution may be applied for any type of network device and also for any number of network devices. In this example, one particular network device 202 is upgraded with new program components as follows. As also indicated above, the network devices in the network 204 may include switches, routers and firewalls, as well as entities configured for caching and packet inspection operations.

The device manager 200 first receives or otherwise detects a "trigger" for initiating the upgrade or component update of device 202, as schematically illustrated by an action 2:1. The trigger in this action may comprise detecting an added, removed or changed policy, i.e. a policy update that affects the network device 202, which requires a program update in the network device 202 when being already part of the network 204, or detecting that the network device 202 is a new device that has just joined the network 204 and needs to be configured for proper operation. The term "program update" should be broadly understood as involving one or more of adding, modifying and removing functionality in the device 202, and the solution is not limited in this respect.

In a next action 2:2, the device manager 200 checks which policy or policies is/are valid for this particular network device 202 and identifies which program components are required to fulfil the identified policy. The policy is identified out of a set of predefined policies 200A and basically comprises rules which determine how the network device 202 should operate in the communication network. The identified policy may further indicate explicitly which program components it requires, or the device manager 200 may otherwise apply some logic for identifying the required program components based on said rules in the policy. In effect, the rules thus specify which program components are required in the device.

In action 2:2, the device manager 200 further checks which of the required program components are missing in the network device 202. In some cases, the network device 202 has none of the required program components meaning that all of them need to be installed. It may also happen that the network device 202 already has all the required program components to fulfill the policy/policies and in that case no installation needs to be done. In further cases, a subset, i.e. only some or just one, of the required program components is missing and needs to be installed in the network device 202.

A final action 2:3 illustrates that the device manager 200 pushes the missing program components to the network device 202, so as to accomplish the required program update or upgrade or configuration. Depending on the technology used, the device manager 200 may push a renewed artifact which will include these new program components. Pushing the missing program components may be performed by individually pushing the program components one by one, or by pushing a single artifact which contains all new program components.

Pushing program components to the network device 202 may be done according to regular procedures, e.g. using a suitable Application Programming Interface API, which are not necessary to describe here. In some non-limiting examples, this may be done via HTTP or using a remote installation protocol. It is an advantage that the procedure of upgrading or configuring any number of network devices 202 in this way can be entirely controlled by a single central device manager 200 in a consistent and wholly automatic manner according to the relevant predefined policy/policies. Another significant advantage is that the network devices 202 need no extra or specific functionality to achieve such an upgrade/update/configuration including logic for deciding/choosing which components are installed which is performed by the central device manager 200. The network devices only need to support very basic install/remove operations for program components.

Figure 3:
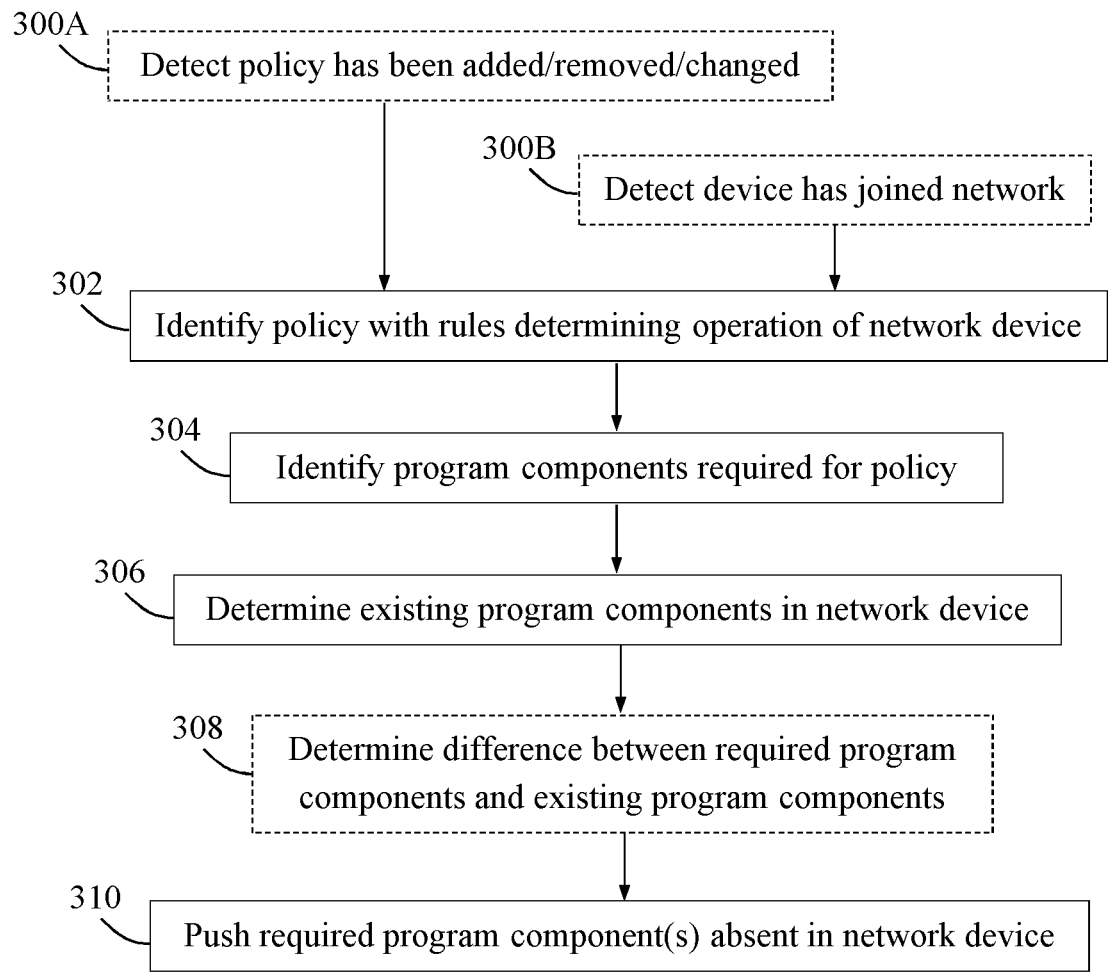
FIG. 3 is a flow chart illustrating a procedure in a device manager, according to further example embodiments.

An example will now be described with reference to the flow chart in FIG. 3, of how the solution may be employed in terms of actions performed by a device manager such as the above-described device manager 200. FIG. 3 is described below with further reference to FIG. 2 although without limitation to such a communication scenario.

Some optional example embodiments that could be used in this procedure will also be described below. The procedure may be employed when the device manager 200 is operating to support any network device(s) in any type of communication network, e.g. an SDN. Further, any suitable techniques, protocols and standards may be employed by the device manager 200 for communication with network devices in the manner described below.

At least some of the actions shown in FIG. 3 are thus performed by a device manager 200, for controlling program components in a network device 202, wherein the network device 202 is used for handling data traffic in a communication network 204. Even though the procedure is described for just one device, it can be employed for any number of network devices.

It was mentioned above that a program upgrade/update/configuration may be triggered in different ways. One alternative and optional action 300A illustrates that the device manager 200 may detect that a policy, i.e. one or more policies, affecting the network device 202 has been added, removed or changed. The added, removed or changed policy may indicate that the program update is required, e.g. for adapting the network device's 202 operation to some new or modified function, or to a newly deployed network structure or topology.

Another alternative and optional action 300B illustrates that the device manager 200 may detect that the network device 202 has joined, i.e. been connected to, the network 204 and therefore needs to be configured with suitable program components in order to operate according to one or more policies valid for the device 202. Another possible trigger, not shown, for a program upgrade/update may be that a policy that is valid for the network device 202 has been changed in such a manner that an upgrade or update is needed in the network device 202.

In a next action 302, the device manager 200 identifies a policy out of a set of predefined policies 200A, the identified policy comprising rules which determine how the network device 202 should operate in the communication network. The set of predefined policies 200A may be accessed from a suitable storage or database located within or outside the device manager 200. As said above, a policy in this context should be understood as at least one policy since the network device 202 may be required to fulfil more than one policy. In this action, to mention a few illustrative but non-limiting examples, the policy may be identified based on the network device's 202 identity, type, model, manufacturer and/or location in the network, and the policy may be identified as valid for this individual network device 202 or as valid for a set of network devices that includes this particular network device 202.

In a further action 304, the device manager 200 also identifies which program components are required to fulfil the identified policy or policies. It was mentioned above that the required program components may e.g. be explicitly indicated in the policy or may be logically determined based on the rules in the policy.

The device manager 200 further determines which existing program components are already present and installed in the network device 202, in another action 306, as any such existing program components will not be necessary to push to the device 202. An optional action 308 illustrates an example embodiment where the device manager 200 may determine a difference between the one or more required program components identified in action 304 and the existing ones determined in action 306. It may further be determined that said difference includes that one or more existing program components in the network device 202 are actually not required by the identified policy/policies and can be removed from the network device 202.

Finally, the device manager 200 pushes to the network device 202 one or more of the required program components which are found to be absent, i.e. missing, in said existing program components in the network device 202, as illustrated by a final action 310. The required but absent program component(s) that need to be pushed may thus correspond to the difference determined in action 308. Here, the term "absent" indicates any program components that need to be pushed to the network device 202, depending on the technology used in the device, in order to comply with the identified policy or policies. This further implies that at least the absent program components are pushed to the network device 202 in this action, but depending on the dataplane technology used it may sometimes be necessary to actually push all the required program components to the network device 602 including both the absent ones and the already existing ones. For example, it may be necessary to re-compile and re-deploy all program components again in the network device 202.

Some further optional embodiments of the above procedure will now be described, sometimes with reference to FIGS. 2 and 3. In one example embodiment, the method may be performed when detecting that the network device 202 has joined the communication network 204, as of action 300B, or when detecting that a policy affecting the network device 202 has been added, removed or changed, as of action 300A. These alternatives have been described above.

If the method is triggered by an added, removed or changed policy that affects the network device 202, further example embodiments may include that the added, removed or changed policy is valid for any of: an identity the network device 202, a type of the network device 202, a model of the network device 202, and a manufacturer of the network device 202. Alternatively or additionally, the added, removed or changed policy may be valid for network devices in a specific area or part of the network. The above policy could also be valid for more than one of the above factors in combination. In general, a policy may be valid for any number of network devices and the solution is not limited in this respect.

In other example embodiments, the policy identified in action 302 may be valid for one or more of: an identity the network device 202, a type of the network device 202, a model of the network device 202, and a manufacturer of the network device 202. Similar to the foregoing embodiments, the identified policy may be valid for network devices in a specific area or part of the network. It should be noted that the above embodiments are just some examples of how network devices could be grouped together for dictating validity of a policy.

In another example embodiment, the policies in the set of predefined policies 200A may have priorities so that a policy having a first priority overrides a conflicting policy having a second priority that is lower than the first priority. This means that the policy with higher priority should be fulfilled while the policy with the lower priority can be ignored in case the two policies require contradictory or incompatible operations. This way, any conflicts between two policies that are valid for the network device 202 but cannot be fulfilled at the same time, e.g. by requiring contradictory or incompatible operations that cannot be combined, will be solved if the policies have different priorities according to this embodiment.

In some further example embodiments, the device manager 200 may determine the existing program components in action 306 by querying the network device 202 to identify its existing program components, or by retrieving information on the existing program components from a data storage where such information about currently installed program components in different network devices is maintained. In this context, the term "existing" thus indicates that the program components have been installed previously and are thereby already present in the network device 202. The existing program components may or may not need to be pushed to the device depending on the technology used, as discussed above.

In some further example embodiments, the required program components may be executable in a dataplane of the network device 202 to perform operations related to any of: switching, forwarding, routing, firewalling, caching, and packet inspection. In another example embodiment, the communication network 204 may be a Software Defined Network, SDN, although the solution could be used for other types of networks as well, including wireless networks, virtual networks and any other type of and data communication networks.

Figure 4:
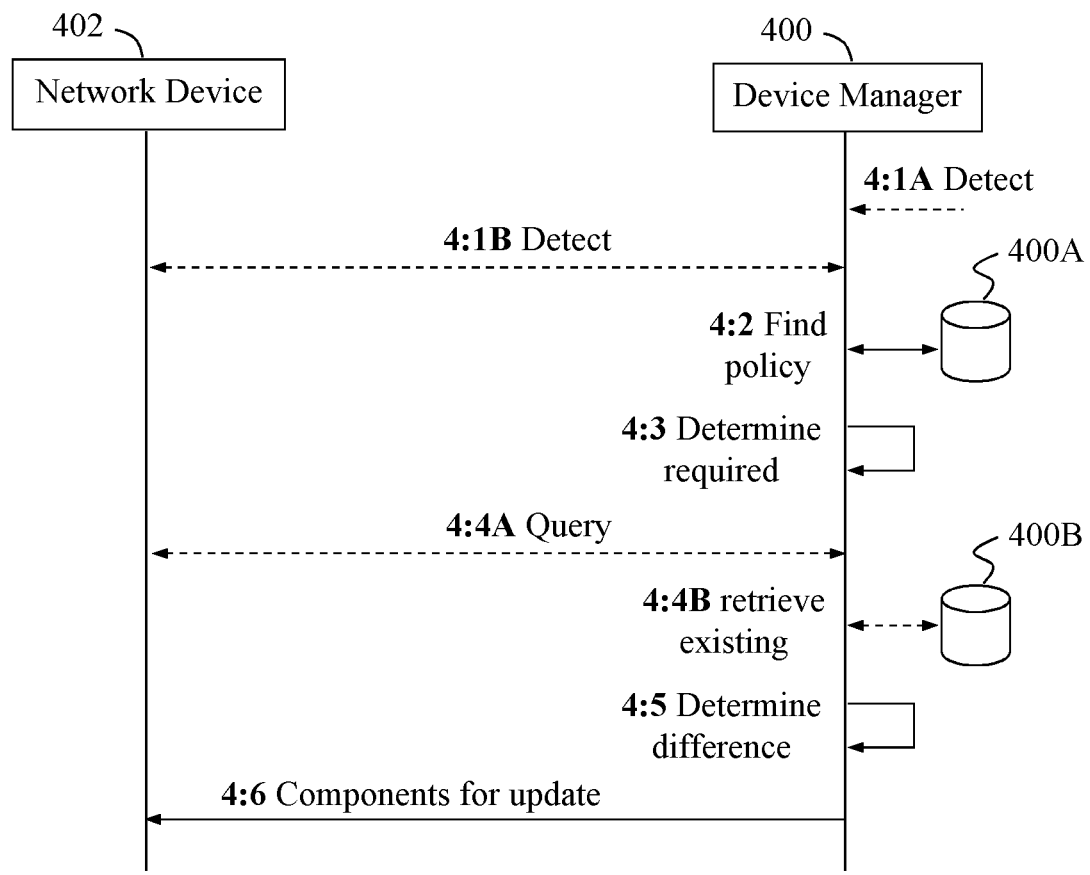
FIG. 4 is a signaling diagram illustrating an example of a procedure when the solution is used, according to further example embodiments.

An example of how the solution could be used in practice will now be described with reference to the signaling diagram in FIG. 4. This figure illustrates various actions and signaling involving a device manager 400 and a network device 402 of a communication network, the device manager 400 basically operating in accordance with FIG. 3 and at least some of the above-described embodiments. The device manager 400 and the network device 402 thus correspond to the above device manager 200 and network device 202, respectively.

A first action 4:1A illustrates one alternative where the device manager 400 detects that an added, removed or changed policy affecting the network device 202 requires a program update in the network device 402, which corresponds to action 300A above. This may be detected as a policy update request made by a network management node or the like, not shown. Another alternative action 4:1B illustrates that the device manager 400 may instead detect that the network device 402 has joined the network, which corresponds to action 300B above. Even though actions 4:1A and 4:1B are described as alternatives, it should not be excluded that both could be performed, e.g. at different points in time.

Having found out that the network device 402 may need updating of its currently existing program components, the device manager 400 retrieves or "finds" a policy, i.e. one or more policies, valid for the network device 402 from a storage or database 400A where a set of predefined policies are maintained, in a next action 4:2 which corresponds to action 302 above. As said above, the policy comprises operational rules and is valid for the network device 402 in some respect. The device manager 400 also identifies which program components are required for that policy, in another action 4:3 which corresponds to action 304 above, and these program components may e.g. be explicitly indicated in the policy or otherwise derived therefrom.

Then the device manager 400 needs to establish which existing program components are already present in the network device 402, which could be done in two ways as follows. Firstly, the device manager 400 may query the network device 202 to identify its existing program components, as illustrated by an action 4:4A. Secondly, the device manager 400 may alternatively retrieve information on the existing program components from a data storage 400B where information about currently installed program components in different network devices is maintained, as illustrated by another action 4:4B. In this figure, alternative actions 4:1A, 4:1B and 4:4A, 4:4B, respectively, are indicated by dashed arrows. Either of actions 4:4A, 4:4B corresponds to action 306 above.

A further action 4:5 illustrates that the device manager 400 determines the difference between the required program components and the existing program components, which corresponds to action 308 above. As said above, the difference may indicate addition and/or removal of program components to/from the device manager 400. In a final action 4:6, the device manager 400 pushes to the network device 202 any required program components that are absent in the device's 202 existing program components, based on the difference determined in action 4:5. The last action 4:6 thus corresponds to action 310 above.

The above-described solution and its embodiments allow component versioning policies to be enforced in programmable network devices, which could be needed in the case of changes to the network or by introduction of new policies, e.g. to enable new or modified services in the network.

In this solution, dataplane component deployment policies may thus be taken as input from applications and/or human users, and the device manager can basically provide a list of changes required in the network to enforce these policies, e.g.

based on the calculation of differences between current configuration of program components and any missing program components required to fulfil the specified policies. The device manager described herein may also react to changes in the policies or in the network, e.g. according to the above-described triggers in actions 2:1 and 300A/300B.

This device manager may be implemented as an SDN controller, e.g. as part of its core, or as a "plugin", or as part of a network management system or the like. It could also be implemented in a standalone software application.

Figure 5:
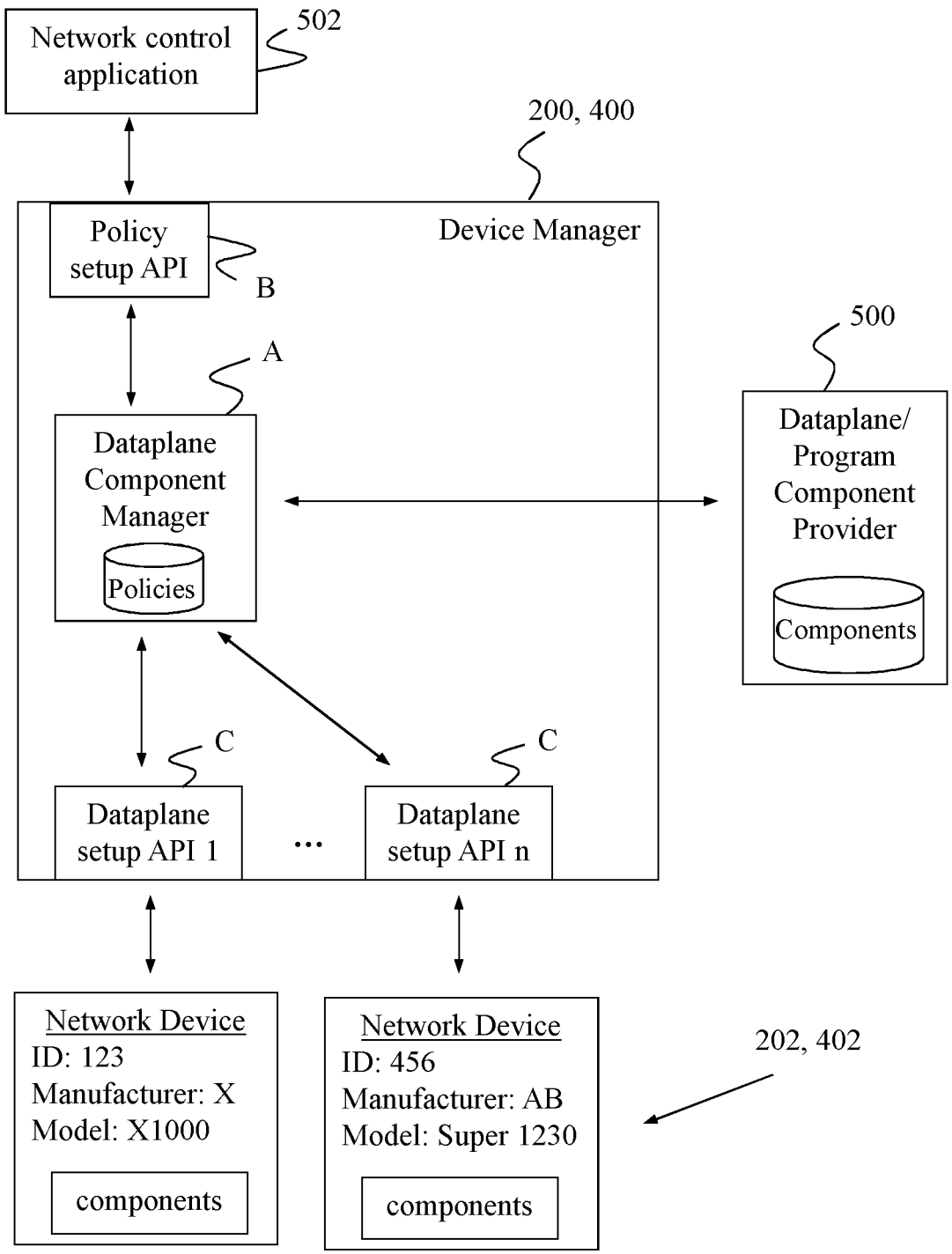
FIG. 5 is a block diagram illustrating an example of how a device manager may be implemented in practice, according to further example embodiments.

An example of how the device manager 200, 400 may be structured in more detail to accomplish the above-described functionality and characteristics, will now be described with reference to the block diagram in FIG. 5. In this example, the program components are executed in a dataplane of the network device 202, 402 and the program components are therefore referred to as "dataplane components". The device manager 200, 400 in this example comprises different modules including a dataplane component manager denoted A, a policy setup API denoted B and a set of dataplane setup APIs 1 . . . n denoted C. It will now be briefly described how these entities or modules may communicate with a dataplane component provider 500, a network control application 502 and a number of network devices 202, 402. The network control application 502 may e.g. be a firewall application.

The dataplane component manager A is a module in the device manager 200, 400 that is responsible for providing a logic and functionality at least to perform actions 302-308.

The dataplane component provider 500 is a module which could be located within or outside the device manager 200, 400 and it is responsible for building and compiling dataplane program components for use by the dataplane component manager A when so requested. The device manager 200, 400 may thus obtain from the dataplane component provider 500 any required program components that need to be pushed to the network device 202. The dataplane component provider 500 may also be denoted a program component provider 500.

The policy setup API B is a part of a northbound interface of the device manager 200, 400 and it is responsible for receiving requests and/or notifications from users and applications, in this case the network control application 502. The policy setup API B forwards such requests added, removed or changed policy is valid for to the dataplane component manager A for deployment. This API could be implemented in several ways, e.g. using HTTP, RPC, CLI, etc.

The Dataplane setup APIs C are a part of a southbound interface of the controller and they are responsible for taking ready-to-deploy dataplane components built by the dataplane component provider 500 and pushing them to the devices 202, 402. The connection to the devices 202, 402 may be obtained through any protocols (SSH/Telnet, HTTP, FTP, etc.). The Dataplane setup APIs C are invoked after a deployment plan or similar has been established in order to deploy the changes to the network. Such a deployment plan may refer to a set of additions/removals of program or dataplane components in a list of network devices.

The network devices 202, 402 are shown to be identified and characterized by an identity ID, manufacturer and model, which information is known or obtained by the device manager 200, 400. Existing dataplane components are also indicated in each network device 202, 402.

Figure 6:
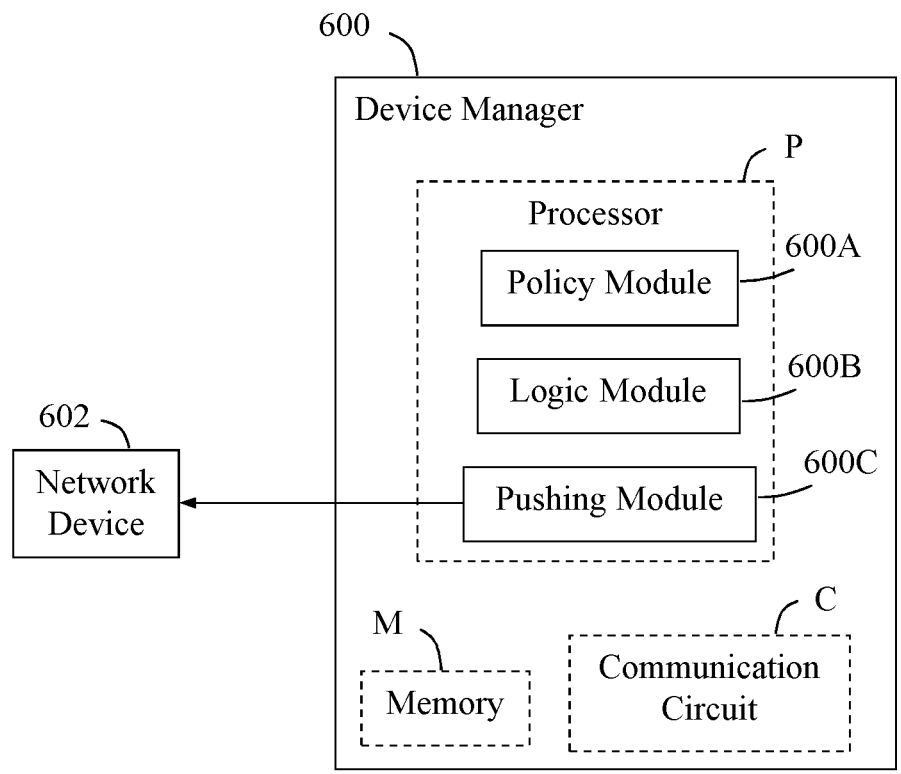
FIG. 6 is a block diagram illustrating an example of how a device manager may be structured, according to further example embodiments.

The block diagram in FIG. 6 illustrates a detailed but non-limiting example of how a device manager 600 may be structured to bring about the above-described solution and embodiments thereof. The device manager 600 may be configured to operate according to any of the examples and embodiments for employing the solution as described herein, where appropriate and as follows. The device manager 600 is shown to comprise a processor P and a memory M, said memory comprising instructions executable by said processor P whereby the device manager 600 is operable as described herein. The device manager 600 also comprises a communication circuit C with suitable equipment for sending and receiving information and messages in the manner described herein.

The communication circuit C is configured for communication with network devices using suitable protocols and interfaces depending on how the respective network devices are operating. Such communication may be performed over any suitable links and nodes depending on the implementation, which is not necessary to describe here as such in any detail. The solution and embodiments herein are thus not limited to using any specific types of networks, technology or protocols for communication.

The device manager 600 comprises means configured or arranged to perform at least some of the actions 300A/B to 310 in FIG. 3 and more or less in the manner described above for the device managers 200 and 400. The device manager 600 is arranged or configured to control program components in a network device 602, wherein the network device 602 can be used for handling data traffic in a communication network.

The device manager 600 is configured to identify a policy out of a set of predefined policies, the identified policy comprising rules which determine how the network device 602 should operate in the communication network. This identifying operation may be performed by a policy module 600A in the device manager 600, e.g. in the manner described for action 302 above. As indicated above, the identified policy is not necessarily just one policy and may thus include any number of policies valid for the network device 602. The policy module 600A could alternatively be named a retrieving module, identifying module or determining module.

The device manager 600 is further configured to identify program components required to fulfil the identified policy. This operation may be performed by a logic module 600B in the device manager 600, e.g. as described for action 304 above. The logic module 600B could alternatively be named a control module, policy recalculation module or analyzing module. The device manager 600 is further configured to determine existing program components present in the network device 602. This operation may be performed by the logic module 600B, e.g. as described for action 306 above.

The device manager 600 is also configured to push to the network device 602 one or more of the required program components absent in said existing program components in the network device 602. This operation may be performed by a pushing module 600C in the device manager 600, e.g. as described above for action 310. As said above, it may in some cases be necessary to push all the required program components, including the already existing ones, to the network device 602. The pushing module 600C could alternatively be named a sending module, configuring module, deployment module or installing module.

It should be noted that FIG. 6 illustrates various functional modules or units in the device manager 600, and the skilled person is able to implement these functional modules or in practice using suitable software and hardware. Thus, the solution is generally not limited to the shown structures of the device manager 600, and the functional modules or units 600A-C therein may be configured to operate according to any of the features and embodiments described in this disclosure, where appropriate.

Figure 6A:
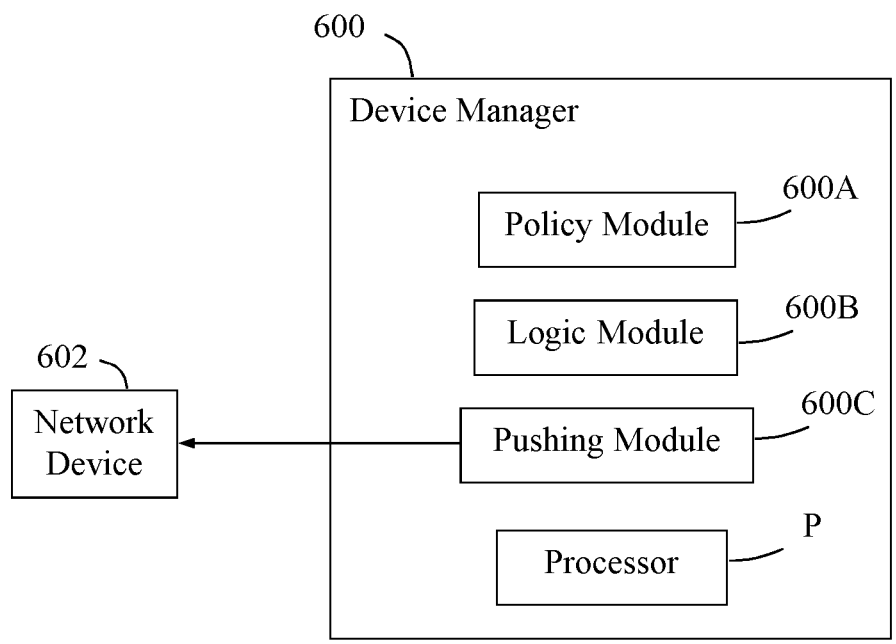
FIG. 6A is a block diagram illustrating another example of how a device manager may be structured, according to further example embodiments.

Another example of how the device manager 600 may be configured is schematically shown in the block diagram of FIG. 6A. In this example, the device manager 600 comprises the functional modules 600A-C and a processor P, the modules 600A-C being configured to operate in the manner described above as controlled by the processor P.

The functional modules or units 600A-C described above can be implemented in the device manager 600 by means of suitable hardware and program modules of a computer program comprising code means which, when run by the processor P causes the device manager 600 to perform at least some of the above-described actions and procedures.

In either of FIG. 6 and FIG. 6A, the processor P may comprise a single Central Processing Unit (CPU), or could comprise two or more processing units such as CPUs. For example, the processor P may include a general purpose microprocessor, an instruction set processor and/or related chip sets and/or a special purpose microprocessor such as an Application Specific Integrated Circuit (ASIC). The processor P may also comprise a storage for caching purposes.

Each computer program may be carried by a computer program product in the device manager 600 in the form of a memory having a computer readable medium and being connected to the processor P. The computer program product or memory in the device manager 600 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or Hard Drive storage (HDD), and the program modules could in alternative embodiments be distributed on different computer program products in the form of memories within the device manager 600.

The solution described herein may be implemented in the device manager 600 by means of a computer program product comprising a computer program with computer readable instructions which, when executed on the device manager 600, cause the device manager 600 to carry out the actions and features according to any of the above embodiments, where appropriate.

While the solution has been described with reference to specific exemplifying embodiments, the description is generally only intended to illustrate the inventive concept and should not be taken as limiting the scope of the solution. For example, the terms "device manager", "network device", "program component", "policy" and "priority" have been used throughout this disclosure, although any other corresponding entities, functions, and/or parameters could also be used having the features and characteristics described here. The solution is defined by the appended claims.

The invention claimed is:

1. A method performed by a device manager for controlling program components in a network device that control operation of the network device, wherein the network device is used for handling data traffic in a communication network, the method comprising:

receiving, from a network management node, a policy update request for the network device;

in response to receiving the policy update request, identifying a policy for the network device out of a set of predefined policies by accessing the set of predefined policies from storage or database external to the device manager, the identified policy comprising rules which determine how the network device should operate in the communication network and have priorities so that a policy with a first priority overrides a conflicting policy with a second priority lower than the first priority;

identifying program components for the network device required to fulfil the identified and prioritized policy;

retrieving information on existing program components installed on the network device from a data storage containing currently installed program components in different network devices, including the network device;

determining a difference between program components identified to fulfill the identified and prioritized policy from existing program components installed on the network device to identify required program components absent in the network device to fulfill the identified and prioritized policy; and pushing, to the network device, the required program components absent in the network device to fulfill the identified and prioritized policy.

2. The method according to claim 1, wherein the method is performed in response to the network management node detecting that the network device has joined the communication network or that a policy affecting the network device has been added, removed, or changed.

3. The method according to claim 2, wherein the added, removed, or changed policy is valid for one or more of: an identity of the network device, a type of the network device, a model of the network device, and a manufacturer of the network device.

4. The method according to claim 1, wherein the identified policy is valid for one or more of: an identity of the network device, a type of the network device, a model of the network device, and a manufacturer of the network device.

5. The method according to claim 1, wherein the required program components are to be executed in a dataplane of the network device to perform operations related to one or more of: switching, forwarding, routing, firewalling, caching, and packet inspection.

6. The method according to claim 1, wherein the communication network is a Software Defined Network (SDN).

7. The method according to claim 1, wherein the device manager obtains from a program component provider the required program components that need to be pushed to the network device.

8. A device manager arranged to control program components in a network device that control operation of the network device, wherein the network device is used for handling data traffic in a communication network, wherein the device manager comprising:

a processor; and a memory containing instructions which, when executed by the processor, cause the device manager to perform operations to:

receive, from a network management node, a policy update request for the network device;

in response to receipt of the policy update request, identify a policy for the network device out of a set of predefined policies by accessing the set of predefined policies from storage or database external to the device manager, the identified policy comprising rules which determine how the network device should operate in the communication network and have priorities so that a policy with a first priority overrides a conflicting policy with a second priority lower than the first priority;

identify program components for the network device required to fulfil the identified and prioritized policy;

retrieve information on existing program components installed on the network device from a data storage containing currently installed program components in different network devices, including the network device;

determine a difference between program components identified to fulfill the identified and prioritized policy from existing program components installed on the network device to identify required program components absent in the network device to fulfill the identified and prioritized policy; and push, to the network device, the required program components absent in the network device to fulfill the identified and prioritized policy.

9. The device manager according to claim 8, wherein the device manager is configured to operate in response to the network management node detecting that the network device has joined the communication network or that a policy affecting the network device has been added, removed, or changed.

10. The device manager according to claim 9, wherein the added, removed, or changed policy is valid for one or more of: an identity of the network device, a type of the network device, a model of the network device, and a manufacturer of the network device.

11. The device manager according to claim 8, wherein the identified policy is valid for one or more of: an identity of the network device, a type of the network device, a model of the network device, and a manufacturer of the network device.

12. The device manager according to claim 8, wherein the required program components are to be executed in a dataplane of the network device to perform operations related to one or more of: switching, forwarding, routing, firewalling, caching, and packet inspection.

13. The device manager according to claim 8, wherein the communication network is a Software Defined Network, SDN.

14. The device manager according to claim 8, wherein the device manager is configured to obtain from a program component provider the required program components that need to be pushed to the network device.

* * * * *